United States Patent [19]

Scibor-Rylski

[11] 3,958,862
[45] May 25, 1976

[54] ELECTRO-OPTICAL MODULATOR
[76] Inventor: Marek Tadeusz Victor Scibor-Rylski, 14A Hawbush Rise, Welwyn, Hertfordshire, England
[22] Filed: June 14, 1974
[21] Appl. No.: 479,399

[52] U.S. Cl. .......................... 350/160 R; 332/7.51; 350/96 WG; 350/150; 350/162 R
[51] Int. Cl.² .......................................... G02F 1/32
[58] Field of Search ............ 350/150, 160 R, 162 R, 350/96 WG; 332/7.51

[56] References Cited
UNITED STATES PATENTS
3,300,739  1/1967  Mortley ........................... 350/162 R
3,887,885  6/1975  Hattori et al. .................... 350/160 R OTHER PUBLICATIONS
Gia Russo et al., "Sputtered Ferroelectric Thin—Film Electro—Optic Modulator," *Applied Physics Letters*, Vol. 23, No. 5, Sept. 1973, pp. 229–231.

*Primary Examiner*—Vincent P. McGraw
*Attorney, Agent, or Firm*—Hubbell, Cohen, Stiefel & Gross

[57] ABSTRACT

An electro-optical modulator comprises a block of electro-optical material, a pattern of interdigitated electrodes on one face of the material, a source of light adapted to provide a non-convergent beam of light and arranged to apply said beam directly to the block of material so as to suffer a single internal reflection from said one face and to travel in the general direction of the length of the electrodes, and means for applying a modulating voltage to the electrodes.

7 Claims, 6 Drawing Figures

ELECTRO-OPTICAL MODULATOR

This invention relates to electro-optical modulators. Modulators such as Kerr cells are well known, in which the plane of polarization of light is rotated on transmission of the light through a suitable optically transparent medium. The present invention is concerned with the formation of a diffraction pattern rather than the rotation of the plane of polarization.

The diffraction effect has already been described in IEEE Journal of Quantum Electronics, Vol. QE9, No. 6, June 1973 pages 559 to 563. In that arrangement, diffraction of a laser beam is caused by the periodic skin field behind an electroded surface of an electro-optic crystal at the moment of total internal reflection. Interdigital modulation electrodes are attached to the y–z surface of the crystal. This arrangement requires the laser beam to be focused by means of a lens along a line transverse to the length of the electrodes at the point of total internal reflection, and the beam emerging from the crystal is again focused by means of a lens to form the diffraction pattern on a screen.

It is an object of the present invention to provide an electro-optical modulator in which no lens is required to focus the input light beam onto a face on the electro-optic material. When high light energies are used, lenses may cause an undesirable increase of power density in the material.

It is another object of the invention to provide an electro-optical modulator which will operate with white light, and is not restricted to monochromatic light.

It is a further object of the invention to provide an electro-optical modulator which could operate with unpolarized light.

It is a further object of the invention to provide an electro-optical modulator which does not require an accurately collimated beam of light, nor a convergent beam.

According to the invention there is provided an electro-optical modulator comprising a block of electro-optical material, a pattern of interdigitated electrodes on one face of the material, a source of light adapted to provide a non-convergent beam of light and arranged to apply said beam directly to the block of material so as to suffer a single internal reflection from said one face and to travel in the general direction of the length of the electrodes, and means for applying a modulating voltage to the electrodes.

Examples of the invention will now be described with reference to the accompanying drawings, in which.

Figure 1:
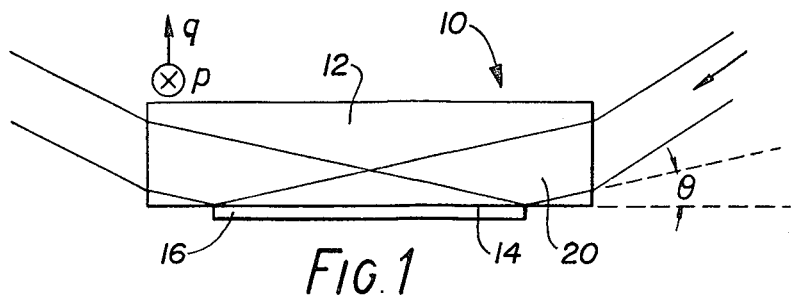
FIG. 1 is a diagrammatic side elevation of a modulation device.
Figure 2:
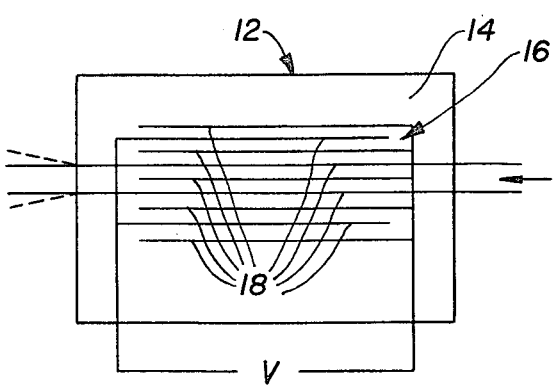
FIG. 2 is a diagrammatic under plan of a modulation device.

The modulation device 10 shown in FIGS. 1 and 2 comprises a $LiNBO_3$ xy cut crystal 12. One surface 14 of the crystal in which p is parallel to the optical axis is polished, and an interdigital electrode pattern 16 3 mm. wide and 8 mm. long is deposited or placed in intimate contact with the polished surface 14. The electrodes 18 have a pitch (that is, distance between centres) of 0.1 mm. The electrodes 18 are preferably vacuum deposited copper on chromium, and offer good adhesion properties. Typical thicknesses are 1 and 10 $\mu$m for chromium and copper respectively.

The lengths of the electrodes 18 extend in the direction of the crystal axis, and the incident beam of light 20 travels generally in this direction, being inclined by the angle $\theta$ to the electrode face 14. The angle $\theta$ is small so that the total internal reflection of the light beam takes place over a long length of the electrodes 18 relative to the width of the beam 20. When the potential is applied to the interdigital electrodes 18, the total internally reflected light is diffracted, and the light distribution between the various orders depends on the voltage between the electrodes 18. The voltage between the electrodes causes a field to extend between the electrodes and for a short distance equal to approximately one half the electrode pitch into the body of the crystal, and the influence of the field on the crystal causes a grating effect. The grating effect is similar when the electrode pattern is formed on the surface with Oq parallel to the crystal axis, but less marked. The energy factor is about 11% lower in this case.

Figure 3:
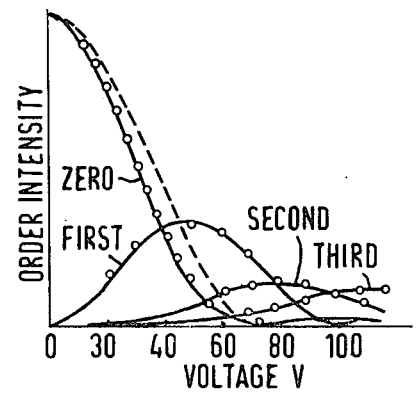
FIG. 3 is a family of intensity/voltage curves for different diffraction orders.

FIG. 3 illustrates how the light is distributed among the various orders of the diffraction pattern with variation in voltage applied across the electrodes. At zero voltage, all the light is directed in the zero order beam, that is, there is no diffraction, but the intensity of the zero order beam is reduced as the voltage is increased until at about 72 volts the zero order is extinguished. The light directed into the first order beam increases to a maximum at about 50 volts, and then is extinguished at about 100 volts. The light in the second order beam increases slowly to a maximum at about 75 volts, and then decreases, and the third order increases to a maximum at about 120 volts. As with diffraction patterns from normal gratings, the maximum intensities of the different order patterns decrease with the number of the order.

Figure 4:
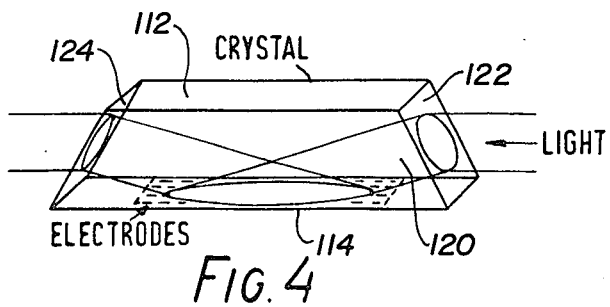
FIG. 4 is a perspective view of an alternative modulation device.
Figure 5:
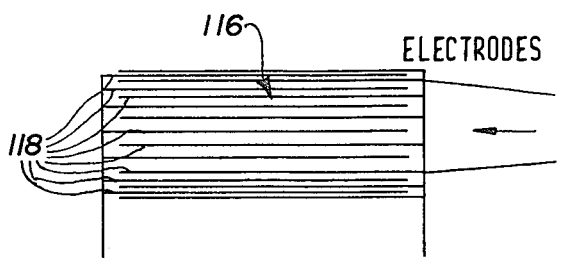
FIG. 5 shows a modified electrode arrangement.

The arrangement of FIG. 1 has the incident beam at an angle to the emergent beam, but with the faces of the crystal 112 cut as shown in FIG. 4, the refraction of the incident beam 120 at the first end face 122 causes light to be reflected from a general direction parallel to the length of the electrodes 118 onto the face 114 on which the electrode pattern 116 is formed, and the opposite end face 124 is cut so that the diffraction pattern is refracted to emerge in the same general direction as the incident light beam, that is parallel to the length of the electrodes. The end faces 122 and 124 are cut so that the angle through which the beam is refracted at that face is equal to the complement of the angle of reflection at the electroded face 114. The end faces can also be cut at the Brewster angle for the light beams, such that reflection losses are cut to a minimum.

Figure 6:
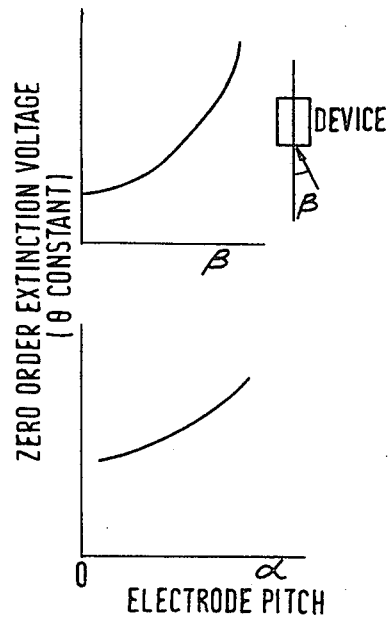
FIG. 6 is a diagrammatic representation of the relationship of zero order extinction voltage to the angle of the incident beam and the electrode separation.

It has been found that the light beams provided by some laser sources are slightly divergent, and the variation in angle between different parts of the beam causes a variation in the diffraction pattern. The divergence of the incident beam can be accommodated (at least to the first order) by a variation in the pitch of the electrodes. It has been found that the zero order extinction voltage (about 75 volts in FIG. 3) increases as the separation of the electrodes increases, and it also increases when the incident light beam is inclined (by angle B) to the length of the electrodes (see FIG. 6). By decreasing the electrode separation over the parts of the beam where the angle of inclination is higher, compensation to the first order can be achieved. Such an arrangement avoids the need for lenses to provide an accurately collimated beam from a divergent beam source.

Although it is possible by decreasing the electrode separation to reduce the voltage at which the zero order is extinguished, the decrease of separation decreases the depth into the crystal 12 or 112 to which the electrode field penetrates, so that a lower extinguishing voltage is achieved at the cost of sensitivity.

It is possible to use the modulators as described above for a very fast open-loop analogue-to-code conversion process, the pattern containing information about the applied device voltage in a parallel word form. The encoding process has been shown to operate in the nano-second region. It is insensitive to temperature variation because a phase-modulated technique is used, and is virtually independent of temperature if temperature-independent electro-optic coefficients are used, for example $r_{22}$ in $LiNBO_3$.

The modulators have been tested with incoherent light from a tungsten source and could be used as limited extinction ratio modulators in zero order and as chromatic filters in higher orders as the extinction voltages and inter-order angles vary with the incident wavelength. Extinction of the voltages at which a maximum occurs in any order and the sine of the inter-order angles vary linearly with the wavelength in the material. The useful wavelengths extend into the infra-red region, where high inter-order angles are available.

Suitable electro-optic materials include, besides $LiNBO_3$, $LiTaO_3$, BSN, KTN, ADP, KDP, $KD^*P$, and KDA. Zero order extinction voltages of as low as 5 volts are believed to be available with material such as KTN.

What is claimed is:

1. An electro-optical modulator comprising:

a block of electro-optical material;

a source of light for providing a non-convergent beam of light directly to said block of material to travel through said block in a given direction to suffer a single internal reflection from one face of said block;

means for modulating said light beam including a pattern of interdigitated elongated electrodes on said one face of said block, the lengths of said electrodes extending in the general direction of travel of said light beam, and means for applying a modulating voltage to said electrodes.

2. A modulator as claimed in claim 1, wherein the source is adapted to provide a slightly divergent beam of light, the pitch of the electrodes varying across the width of the beam, being lowest where the light is travelling generally along the length of the electrodes, and increasing as the light diverges from the length of the electrodes so as to compensate for the divergence of the light in the resulting diffraction pattern.

3. A modulator as claimed in claim 1, comprising an end face to receive the beam of light and a second end face from which the diffraction pattern emerges, said end faces being arranged relative to said one face so that the angle through which the beam is refracted at each end face is equal to the complement of the angle of incidence of the beam at said one face.

4. A modulator as claimed in claim 1, wherein the source of light is adapted to provide a coherent beam of light.

5. A modulator as claimed in claim 1, wherein the source of light is adapted to provide a monochromatic beam of light.

6. A modulator as claimed in claim 1, wherein the source of light is adapted to provide a collimated beam of light.

7. A modulator as claimed in claim 1, wherein the electro-optic material is solid.

* * * * *